United States Patent
Robertson (10) Patent No.: US 10,984,772 B2
(45) Date of Patent: Apr. 20, 2021

(54) LOOP SWITCHER, CONTROLLERS THEREFOR AND METHODS FOR CONTROLLING AN ARRAY OF AUDIO EFFECT DEVICES

(71) Applicant: Luke Robertson, Ottawa (CA)

(72) Inventor: Luke Robertson, Ottawa (CA)

( * ) Notice: Subject to any disclaimer, the term of this patent is extended or adjusted under 35 U.S.C. 154(b) by 0 days.

(21) Appl. No.: 16/542,761

(22) Filed: Aug. 16, 2019

(65) Prior Publication Data

US 2021/0049991 A1    Feb. 18, 2021

(51) Int. Cl.

| | | |
|---|---|---|
| *G10H 1/34* | (2006.01) | |
| *G10H 1/00* | (2006.01) | |
| *G10H 1/18* | (2006.01) | |
| *G10H 1/36* | (2006.01) | |
| *G06F 9/32* | (2018.01) | |

(52) U.S. Cl.
CPC .............. *G10H 1/348* (2013.01); *G06F 9/325* (2013.01); *G10H 1/0091* (2013.01); *G10H 1/18* (2013.01); *G10H 1/361* (2013.01)

(58) Field of Classification Search
CPC ........ G10H 1/348; G10H 1/0091; G10H 1/18; G10H 1/361
USPC .......................................................... 84/602
See application file for complete search history.

(56) References Cited

U.S. PATENT DOCUMENTS

| | | | | |
|---|---|---|---|---|
| 4,030,397 A | * | 6/1977 | Nelson ...................... | G10H 1/46 84/678 |
| 4,479,238 A | * | 10/1984 | Spector .................... | H03G 5/04 361/725 |
| 4,481,661 A | * | 11/1984 | Spector .................... | H03G 5/04 361/726 |
| 4,509,190 A | * | 4/1985 | Spector .................... | H04R 3/12 381/119 |
| 5,475,214 A | * | 12/1995 | DeFranco ................ | G10H 1/00 250/221 |
| 5,700,966 A | * | 12/1997 | LaMarra ............... | G10H 1/0066 84/645 |
| 7,139,625 B2 | * | 11/2006 | Aiso ..................... | G11B 27/031 700/94 |

(Continued)

OTHER PUBLICATIONS

Free the Tone, "ARC-53M Audio Routing Controller Owner's Manual," pp. 1-15.

(Continued)

*Primary Examiner* — David S Warren
*Assistant Examiner* — Christina M Schreiber (57) ABSTRACT

The present invention relates to a loop switcher, controllers therefor, and methods for controlling an array of audio effect devices. A controller for controlling a loop switcher with an input, an output, and a plurality of re-orderable loops, comprising a plurality of switches, each of the plurality of switches controls a corresponding one of the plurality of re-orderable loops for coupling the corresponding one of the plurality of re-orderable loops between the input and the output in a sequence; and a plurality of display elements, wherein each of the plurality of switches has a corresponding one of the plurality of display elements, where each display element indicates visually the sequence order of the sequence in which the plurality of re-orderable loops are coupled between the input and the output.

11 Claims, 8 Drawing Sheets

(56) References Cited

U.S. PATENT DOCUMENTS

| | | | | |
|---|---|---|---|---|
| 7,754,956 | B2* | 7/2010 | Gain | G10H 1/0091 |
| | | | | 84/615 |
| D637,645 | S * | 5/2011 | Koursaris | D17/99 |
| 8,565,450 | B2* | 10/2013 | Dronge | G10H 1/0091 |
| | | | | 381/118 |
| 9,595,248 | B1* | 3/2017 | Classe | G10H 1/0058 |
| 9,728,172 | B1* | 8/2017 | Perez | G10H 1/18 |
| 9,905,211 | B1* | 2/2018 | Lee | G10H 1/348 |
| 9,972,295 | B2* | 5/2018 | Lee | G10H 1/0091 |
| 10,657,940 | B1* | 5/2020 | Calder | G10H 1/0008 |
| 2004/0016338 | A1* | 1/2004 | Dobies | G10H 3/188 |
| | | | | 84/662 |
| 2004/0159222 | A1* | 8/2004 | Pennock | G10H 1/02 |
| | | | | 84/662 |
| 2004/0182230 | A1* | 9/2004 | Vlant | G10H 1/348 |
| | | | | 84/662 |
| 2005/0056142 | A1* | 3/2005 | Mapleston | G10H 1/348 |
| | | | | 84/645 |
| 2005/0286213 | A1* | 12/2005 | Rooney | H04H 60/04 |
| | | | | 361/679.02 |
| 2009/0183625 | A1* | 7/2009 | Sanders | G10H 1/0091 |
| | | | | 84/626 |
| 2010/0269670 | A1* | 10/2010 | O'Connor | G10H 1/348 |
| | | | | 84/626 |
| 2013/0118340 | A1* | 5/2013 | D'Amours | G10H 1/348 |
| | | | | 84/746 |
| 2013/0177176 | A1* | 7/2013 | Vumbaco | H04R 3/00 |
| | | | | 381/123 |
| 2013/0208954 | A1* | 8/2013 | Rowe | H04B 1/3827 |
| | | | | 382/119 |
| 2013/0291708 | A1* | 11/2013 | Orshan | G10H 1/0008 |
| | | | | 84/626 |
| 2013/0327201 | A1* | 12/2013 | Urry | G10H 1/348 |
| | | | | 84/626 |
| 2014/0126609 | A1* | 5/2014 | Vumbaco | G10H 1/348 |
| | | | | 375/130 |
| 2014/0270239 | A1* | 9/2014 | Vumbaco | H04R 3/00 |
| | | | | 381/81 |
| 2014/0270266 | A1* | 9/2014 | Vumbaco | H04R 3/00 |
| | | | | 381/123 |
| 2015/0161978 | A1* | 6/2015 | Packouz | G10H 1/40 |
| | | | | 84/746 |
| 2016/0019877 | A1* | 1/2016 | Remignanti | G10H 1/0091 |
| | | | | 84/645 |
| 2018/0144731 | A1* | 5/2018 | McHale | G10H 1/18 |
| 2018/0197512 | A1* | 7/2018 | Perez | G10H 1/043 |
| 2020/0202828 | A1* | 6/2020 | Scherbacovsky | G10H 1/0091 |

OTHER PUBLICATIONS

One Control, "Crocodile Tail Loop," Manual, pp. 1-3.
Voodoo Lab, "PX-8 Plus Pedal Switching System User's Manual," pp. 1-12 (May 2017).
Analog Devices, "16 x 16 Crosspoint Switch Array Database," pp. 1-5 (2018).
The GigRig.com "G2 The Advanced Switching System User Manual," Fifth Edition, pp. 1-37 (May 2017).
RJM "Connecting the Mastermind PBC/6X" Quickstart, pp. 1-2 (Apr. 7, 2019).
Musicom AB, "EFX MK-V Audio Controller Owner's Manual Version 1.90," pp. 1-35.
Roland, "Boss Sound Control Center Computer Controlled SCC-700C-SCC-700F Owner's Manual, " pp. 1-34 (Jul. 1982).
Roland, "Boss Effects Switching System ES-8" pp. 1-22 (2015).

* cited by examiner

| TIME | ACTION | DISPLAY AFTER ACTION | SIGNAL PATH AFTER ACTION |
|---|---|---|---|
| (Start) | Load Empty Preset | A B C D E F (all empty) | Input → Output |
| | Press Button 'C' (Engage Loop C) | C=1 | Input → Loop$_C$ → Output |
| | Press Button D (Engage Loop D) | C=1, D=2 | Input → Loop$_C$ → Loop$_D$ → Output |
| | Press Button 'A' (Engage Loop A) | A=3, C=1, D=2 | Input → Loop$_C$ → Loop$_D$ → Loop$_A$ → Output |
| | Press Button 'F' (Engage Loop F) | A=3, C=1, D=2, F=4 | Input → Loop$_C$ → Loop$_D$ → Loop$_A$ → Loop$_F$ → Output |
| | Press Button C (Remove Loop C from signal path) | A=2, D=1, F=3 | Input → Loop$_D$ → Loop$_A$ → Loop$_F$ → Output |
| (End) | Press Button C (Engage Loop C) | A=2, C=4, D=1, F=3 | Input → Loop$_D$ → Loop$_A$ → Loop$_F$ → Loop$_C$ → Output |

LOOP SWITCHER, CONTROLLERS THEREFOR AND METHODS FOR CONTROLLING AN ARRAY OF AUDIO EFFECT DEVICES

CROSS-REFERENCE TO RELATED APPLICATIONS

N/A

STATEMENT REGARDING FEDERALLY SPONSORED RESEARCH OR DEVELOPMENT TECHNICAL FIELD

N/A

NAMES OF THE PARTIES TO A JOINT RESEARCH AGREEMENT

N/A

BACKGROUND OF THE INVENTION

Field of the Invention

The present invention relates to a control system and method for audio signals. Specifically, the present invention relates to electronic control systems and methods used to route audio signals through an array of audio effect devices. More specifically, the present invention relates to loop switchers, controllers therefor, and methods for controlling an array of audio effect devices.

Description of Related Art

The following prior art references are discussed in the present disclosure:

| U.S. patents | | | |
|---|---|---|---|
| Pat. No. | Kind Code | Issue Date | Patentee |
| U.S. 9,595,248 | B1 | Mar. 14, 2017 | Classe et al. |
| U.S. 8,565,450 | B2 | Oct. 22, 2013 | Dronge et al. |
| U.S. 7,754,956 | B2 | Jul. 13, 2010 | Gain et al. |

U. S. Patent Application Publications:
Pub. No. Kind Code Publication Date Applicant US 2005/0056142 A1 Mar. 17, 2005 Mapleston et al.
Nonpatent Literature Documents:
Analog Devices Inc., *Datasheet: AD75019 16×16 Crosspoint Switch Array*, Revision D (2018)
Free The Tone, *Owner's Manual: ARC-53M Audio Routing Controller*, Version 2.1 (n.d.)
Musicom Lab, *Owner's Manual: EFX MK-V Audio Controller*, Version 1.90, Pages 11-12 (n.d.)
One Control, *User's Guide: Crocodile Tail Loop* (n.d.)
RJM Music Technology, *Quickstart Guide: Mastermind PBC/6x*, Page 2 (April 2019)
Roland Corporation, *Owner's Manual: Boss Sound Control Center SCC-700C-700F* (n.d.)
Roland Corporation, *User Manual: Boss Effects Switching System ES-8*, Page 8 (2015)
TheGigRig Ltd., *User Manual: G2—The Advanced Switching System*, $5^{th}$ Edition, Page 9 (May 2017)
Voodoo Lab, *User's Manual: PX-8 PLUS Pedal Switching System*, Revision 0.9 (2017)

In order to expand the palette of sounds at their disposal, many musicians employ electronic devices commonly referred to as 'effect pedals' to manipulate the sound of their instrument. Examples of commonly available effect pedal types include: distortion, modulation, echo and compression. By connecting multiple effect pedals in series it is possible to create composite effects, further expanding the sound palette of the musician. For example, a composite effect could consist of an echo pedal, a distortion pedal and a compression pedal connected in series. It is well understood that the order in which the effects are applied to the source signal affects the resultant output signal.

In order to facilitate the construction of composite effects, devices known as 'loop switchers' or 'pedal switchers' are commonly employed. Examples of such devices that are commercially available include the G2 by TheGigRig, the ES-8 by BOSS®, the EFX MK-V by Musicom Lab and the Mastermind PBC/6× by RJM® Music Technology. Common features to such devices include: a plurality of send and return jacks to facilitate the electrical connection to external effect pedals, a means of programming a composite effect, and a means of recalling a previously created composite effect. Typically, a previously created composite effect is referred to as a 'preset'.

In general, there are two types of loop switchers—those that have a fixed loop order and those that are capable of re-ordering loops. In the case of a loop switcher with a fixed loop order, the output of any given loop can only be connected to the input of a loop further downstream. For example, considering a loop switcher with 6 loops, the output of loop 3 can be connected to the input of loop 4, 5 or 6 but it cannot be connected to the inputs of loops 1 or 2. In the case of a loop switcher with re-orderable loops the output of a given loop can be connected to any loop input (e.g. considering a 6 loop switcher, the output of loop 3 can be connected to the input of loop 1, 2, 4, 5 or 6). In mathematical terms, a loop switcher with a fixed loop order allows the musician to create any combination of loops; a loop switcher with re-orderable loops allows the musician to create any permutation of loops. As an example, assuming a loop switcher with 6 loops, the fixed loop version has 63 possible presets; the re-orderable loop version has 1,956 possible presets. Loop switchers with re-orderable loops give musicians more sonic options.

Examples of commercially available fixed loop order switchers include the PX-8 PLUS by Voodoo Lab™, the Crocodile Tail Loop by One Control and the ARC-53M by Free The Tone. While all of these devices have programmable presets in which composite effects can be created, modified, saved and recalled they all have limited programmability when compared to loop switchers with re-orderable loops due to their fixed loop order.

One of the first loop switchers capable of re-ordering loops is the BOSS® SCC-700 Sound Control Center released in 1982. The SCC-700 uses discrete lights (one light per loop) to indicate whether a loop is active in the current preset. One limitation of the SCC-700 is the method employed to indicate the order of the active loops. In order to determine the order of the active loops, the user must press the 'Monitor' button, at which point the discrete lights for the active loops sequentially illuminate, one after another, in order, corresponding to the signal path. While functional, this method is limited in that it requires the additional step of pressing a button to initiate the lighting sequence and that it requires the user's full attention in order to observe and interpret the lighting sequence information. The SCC-700 also has the limitation that the user must enter a programming mode to configure and save a composite effect as a preset, thus making it time consuming to modify presets.

Most modern loop switchers that have re-orderable loops make use of an electronic component known as a 'Crosspoint switch' (or 'crossbar switch' or 'matrix switch'). One popular example of this type of component that is suitable for analog audio signals is the AD75019 made by Analog Devices (first released in 1998).

In U.S. Pat. No. 8,565,450 B2 to Dronge et al. ("Dronge et al.") propose a general scheme for a loop switcher consisting of a crosspoint switch, a computing element to control the crosspoint switch, a non-volatile memory element to store user configurable presets, and a user interface consisting of switches and a display(s) to configure and recall presets. In the abstract of Dronge et al. it states, "[t]he user interface enables both pre-programming of the desired effect orders and selection as well as selection of preset stored in a memory component in real-time." As detailed in Dronge et al., this multi-functional nature of the user interface (pre-programming and preset recall) requires a computing element (processor) to have two configurable modes of operation—Performance Mode and Programming Mode. In Performance Mode the user interface is used to recall previously saved presets; in Programming Mode the user interface is used to create, modify and save presets. Dronge et al. do not specify how its device toggles between Performance Mode and Programming Mode.

As described in U.S. Pat. No. 9,595,248 B1 to Classe et al. ("Classe et al."), one major drawback of traditional loop switchers is the time it takes to physically re-program a given preset. The solution proposed by Classe et al. is to remotely control the loop switcher with a wireless device such as a smartphone or tablet running a custom software program. Classe et al. refer to this software as a 'looper App'. This solution has the obvious drawback that it requires an additional piece of hardware to program the loop switcher, not to mention the increase in potential failure modes caused by incorporating a wireless control device. In addition, Classe et al. claim their looper App will generate a digital representation of the physical loop switcher but they provide no explanation as to how this digital representation will shorten the amount of time required to re-program a preset. Moreover, they fail to address loop switchers with re-orderable loops.

US Patent Application Publication No. 2005/0056142 to Mapleston et al. ("Mapleston et al.") discloses "[a] musical effects control device . . . [that] will manage a stage or studio performance . . . by connecting and disconnecting a combination of a plurality of external analogue or digital sound effects devices." (Mapleston et al., abstract). U.S. Pat. No. 7,754,956 to Gain et al. ("Gain et al.") discloses "[a] programmable system for integrating signals in a musical instrument including a programmable device that is configured to create re-callable scenes, where the scenes are representations of audio signals generated by signal devices." (Grain et al., abstract); however, Mapleston et al. and/or Gain et al. do not address many of the deficiencies identified above.

One of the major shortcomings of currently manufactured loop switchers that have re-orderable loops is the method in which presets are programmed using on-board controls. Examples of which include the Mastermind PBC/6X, the BOSS® ES-8 and the Musicom Lab EFX MK-V. While each of the aforementioned products has a different programming sequence, all three have comparable procedural approaches:

a) Each unit has a small on-board display which is used to present menu information
b) Menu navigation is performed by pressing various on-board buttons (a minimum of four unique buttons are used for menu navigation regardless of the device being used)
c) By navigating to the appropriate menu, the display will indicate the active loops, if any, and their order
d) The user can then modify which loops are active
e) Once the active loops are selected the user can then modify the order of the active loops
f) Once the loop order has been set, the user can then save the preset Given the multistep and time-consuming procedures required to create and modify presets (c-f above) using the on-board display and buttons, all three manufacturers of the aforementioned loop switchers have written custom software applications that their end-users can employ to configure presets. All three software packages are designed to run on a personal computer. Once presets are configured using the software application, they can be uploaded to the memory of their respective loop switcher through a communication mean, such as, for example, a USB connection. While the software solution solves the problem of navigating a complex menu system using on-board buttons, as with the solution proposed by Classe et al. it increases the complexity of the system through the addition of an external hardware device.

All of the heretofore known loop switchers with re-orderable loops suffer from one or more of the following disadvantages:
a) In order to create, modify and/or save a preset the user must navigate a series of menus via a multistep process involving the actuation of a plurality of on-board buttons
b) On-board preset programming is sufficiently complex that custom software, run on an external hardware device (e.g. a personal computer or smartphone), is available to create presets which must then be uploaded onto the loop switcher
c) The user has no way of knowing the current order of the active loops unless they enter the programming mode via the on-board menu system
d) Regardless of the preset programming method selected, via the on-board menu/button system or through an external hardware device running custom software, the process takes more time than is reasonable during a live performance or studio session
e) The programming of presets is sufficiently cumbersome as to limit the amount of experimentation the user is willing to do to create new composite effects Accordingly, there has been a long felt need for an improvement in loop switcher controllers and/or methods thereof.

BRIEF SUMMARY OF THE INVENTION

The present invention relates to a control system and method for audio signals. Specifically, the present invention relates to electronic control systems and methods used to route audio signals through an array of audio effect devices. More specifically, the present invention relates to loop switcher control systems and control methods for an array of audio effect devices.

In accordance with a preferred embodiment of the present invention, it provides a loop switcher comprising a controller, comprising a plurality of user actuated switches and at least one display element.

In accordance with another preferred embodiment of the present invention, it provides a controller for controlling a loop switcher with an input, an output, and a plurality of re-orderable loops, comprising: a plurality of switches; and a plurality of display elements; wherein each of the plurality of switches is associated with a corresponding one of the plurality of display elements and controls a corresponding one of the plurality of re-orderable loops for coupling the corresponding one of the plurality of re-orderable loops between the input and the output in a sequence; and the corresponding one of the plurality of display elements indicates visually the sequence order of the corresponding one of the plurality of re-orderable loops in the sequence in which the plurality of re-orderable loops are coupled between the input and the output.

The controller may further comprise a touch panel display, wherein the plurality of switches and the plurality of display elements are mapped on the touch panel display, or the plurality of display elements may be ones selected from the exemplary group consisting of LED dot matrix displays, multi-segmented displays (e.g. 7-segment displays), liquid crystal displays, and OLED displays.

The controller may comprise a plurality of preset switches, each of the plurality of preset switches comprises an indicator for indicating when selected, and wherein the loop switcher comprises a processor and memory for creating, saving, editing and deleting a sequence of the plurality of re-orderable loops associated with each of the plurality of preset switches, and retrieving from the memory and coupling the plurality of re-orderable loops in the sequence associated with the selected one of the plurality of preset switches.

The controller is in communication with the loop switcher wirelessly or wired.

In accordance with yet another preferred embodiment of the present invention, it provides a loop switcher with an input, an output, and a plurality of re-orderable loops, comprising: a controller for controlling the loop switcher, comprising: a plurality of switches; and a plurality of display elements; wherein each of the plurality of switches is associated with a corresponding one of the plurality of display elements and controls a corresponding one of the plurality of re-orderable loops for coupling the corresponding one of the plurality of re-orderable loops between the input and the output in a sequence; and wherein the corresponding one of the plurality of display elements indicates, visually, a sequence order of the corresponding one of the plurality of re-orderable loops in the sequence in which the plurality of re-orderable loops are coupled between the input and the output.

The controller further comprises a plurality of preset switches, each of the plurality of preset switches comprises an indicator for indicating when selected, and wherein the loop switcher comprises a processor and memory for creating, saving, editing and deleting a sequence of the plurality of re-orderable loops associated with each of the plurality of preset switches, and retrieving from the memory and coupling the plurality of re-orderable loops in the sequence associated with the selected one of the plurality of preset switches.

Several advantages of the present invention may be one or more of:
a) The controller provides an easy to understand display, that is always available, that indicates which loops are active and the order of the active loops
b) The controller negates the need for a complex menu system to create, modify and/or save a preset
c) The speed with which presets can be created and modified using the controller means that presets can be created on-the-fly during live musical performances
d) The ease with which presets can be created and modified negates the need for external hardware to program the loop switcher (e.g. a computer running a software application)

BRIEF DESCRIPTION OF THE SEVERAL VIEWS OF THE DRAWING

The present invention is described in more detail with reference to the accompanying drawings, in which:

FIG. 5a shows a front perspective view.

LIST OF REFERENCE NUMERALS

100 Controller
110a to 110f User-actuated switches
120a to 120f Display elements
200 Generalized re-orderable loop switcher
202 Switch interface IC
204 Display driver
206 Processor
208 Memory
210 Electronic switching array
211 Input of electronic switching array
212 Output of electronic switching array
214 to 219 Loops of electronic switching array
230 Audio source
231 Audio output signal
244 to 249 Effect pedals
400 to 414 Steps of program flow chart
500 Loop switcher
510 Housing 530a to 530f User-actuated preset switches
540a to 540f Preset indicator lights
560 Input jack
562 Output jack
570a to 750f Loop send jacks
572a to 572f Loop return jacks
680 Rackmount housing
690 Rotation sensor
692a and 692b Preset display elements
700 Remote housing for controller
710 Communication link
720 Housing for generalized loop switcher
800 Touch display
802 and 804 Partitioned display areas for labels
810a to 810e Touch and display zones
820a to 820e Touch sensitive area
830a to 830e Display area

DETAILED DESCRIPTION OF THE INVENTION

Figure 1:
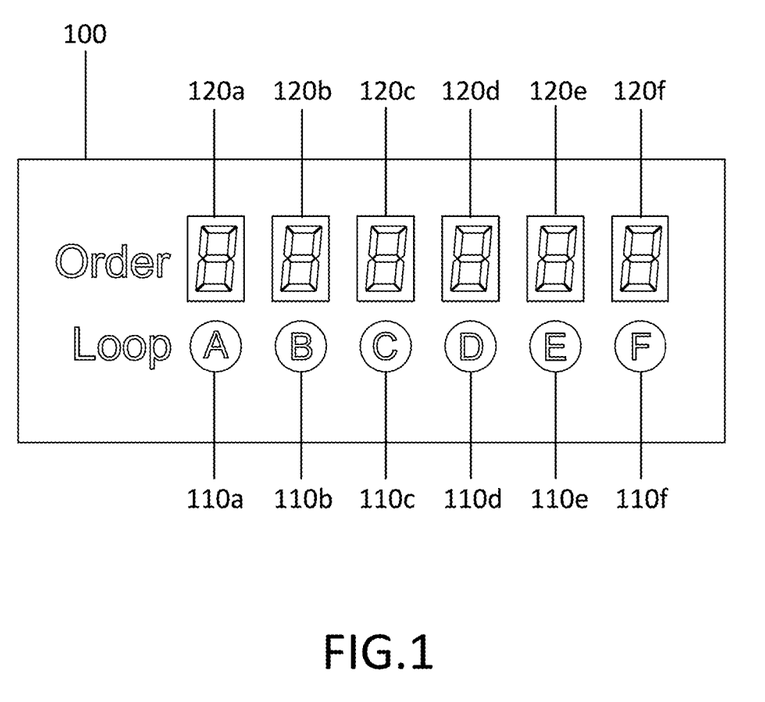
FIG. 1 shows a controller in accordance with a preferred embodiment of the present invention.

Referring to FIG. 1, a controller 100 in accordance with a preferred embodiment of the present invention is shown. The controller 100 comprises a plurality of user-actuated switches 110a to 110f and an equal plurality of display elements 120a to 120f. As shown in FIG. 1, the user-actuated switches 110a to 110f are positioned adjacent to the corresponding display elements 120a to 120f, respectively. While the user-actuated switches 110a to 110f and the corresponding display elements 120a to 120f are shown to be arranged horizontally in FIG. 1, it would be understood that the exact position or orientation of the user-actuated switches relative to the display elements can be varied provided that it remains obvious to a user that the user-actuated switches 110a to 110f and display elements 120a to 120f, respectively, are paired together (i.e. 110a corresponds to 120a, 110b corresponds with 120b, etc.). In general, the number of pairs of user-actuated switches and display elements would correspond to the number of re-orderable loops within the loop switcher.

According to the preferred embodiment of the present invention, the user-actuated switches 110a to 110f may be mechanical pushbuttons, also referred to as tactile switches, or other suitable switches. For example, it will be obvious to anyone familiar in the art that numerous substitutions exist which provide the same functionality, non-limiting examples of which include: capacitive touch buttons, toggle switches, silicone rubber keypads, etc.

According to the preferred embodiment of the present invention, the display elements 120a to 120f are standard 7-segment displays. It would be obvious to anyone familiar in the art that numerous substitutions for such displays exist which provide the same functionality, non-limiting examples of which include: LED dot matrix displays, liquid crystal displays, OLED displays, etc. Also, for example, the display elements 120a to 120f may be mapped onto a (single) screen display.

Figure 2:
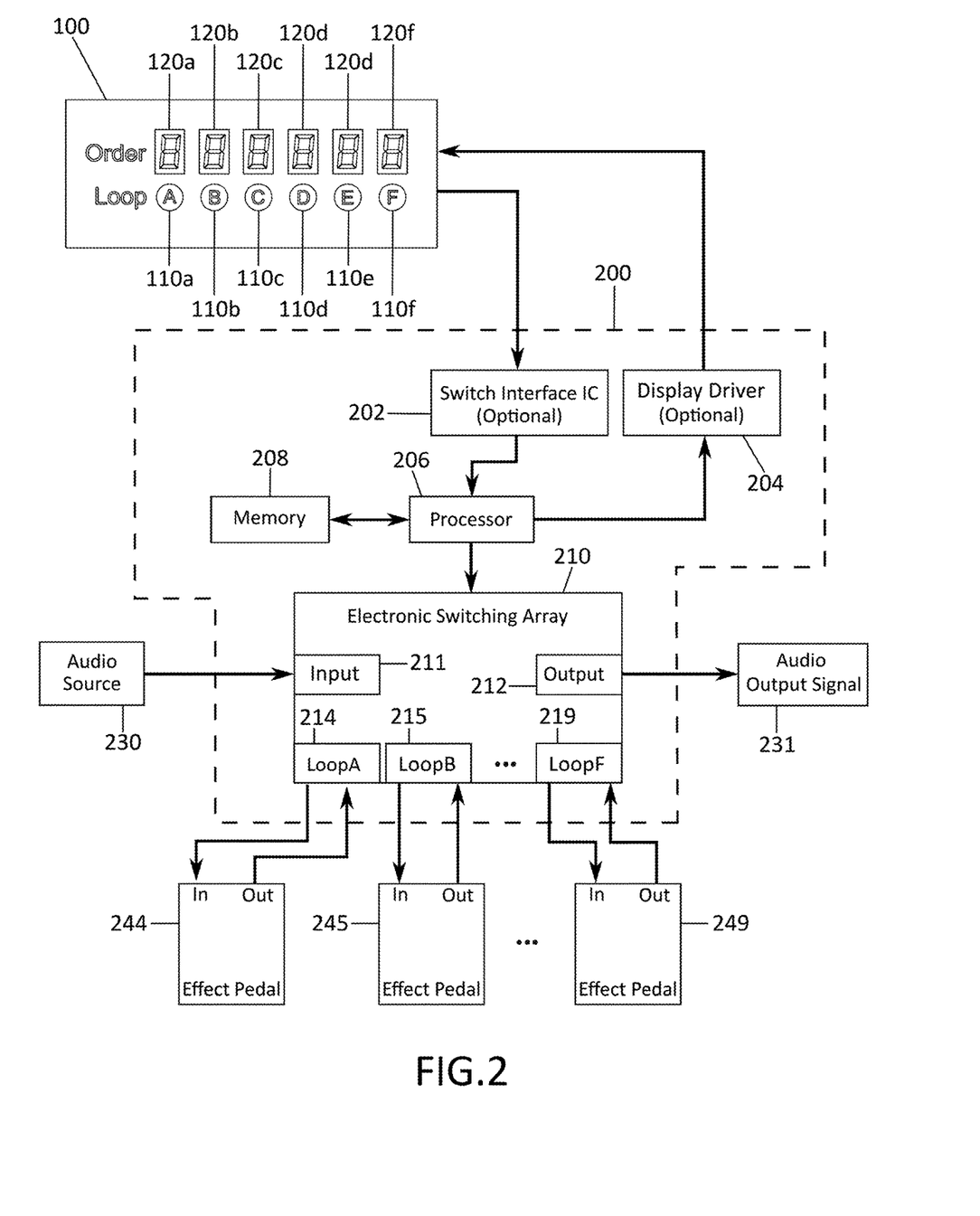
FIG. 2 shows a block diagram of a loop switcher with re-orderable loops in accordance with a preferred embodiment of the present invention.

FIG. 2 illustrates a block diagram of the controller 100 and a generalized re-orderable loop switcher 200 of the present invention. As shown, the user-actuated switches 110a to 110f are in communication with the processor 206 via, for example, an optional switch interface IC 202 (e.g. an I/O expander). When present, the switch interface IC 202 actively monitors the user-actuated switches 110a to 110f and notifies the processor 206 when a user-actuated switch (any one of 110a to 110f) has been pressed. Once notified that a press has been detected, the processor 206 can poll the switch interface IC 202 to determine which specific user-actuated switch 110a to 110f has been pressed. Alternatively, the optional switch interface IC 202 can be removed from the generalized re-orderable loop switcher 200 and the user-actuated switches 110a to 110f can be connected directly to the processor 206. When to include or exclude such a switch interface IC 202 would be well-understood by a person of ordinary skill in the pertinent art. Similarly, the communication connection between the processor 206 and the display elements 120a to 120f may be done wired or wirelessly, and the connection therebetween may be direct or can be made using an intermediary display driver 204.

The audio source 230 is in communication, wired or wirelessly, with the input 211 of the electronic switching array 210 in the loop switcher 200. The electronic switching array 210 is under the control of the processor 206. Depending on the configuration of the active preset (which is stored in memory 208), the audio signal from the audio source 230 may be routed directly to the output 212 of the electronic switching array 210. In which case, the audio source 230 and the audio output signal 231 would provide, for all intents and purposes, the same audio/sound quality (i.e. the audio source 230 signal and the audio output signal 231 would be the same). Alternatively, the audio source 230 may be routed through one or more of the loops 214 to 219 of the electronic switching array 210 and through the corresponding one(s) of the effect pedals 244 to 249. While FIG. 2 shows that each one of the loops 214 to 219 of the electronic switching array 210 is coupled with a corresponding one of the effect pedals 244 to 249, one or more of the loops may be coupled with more than one effect pedal.

Figure 3:
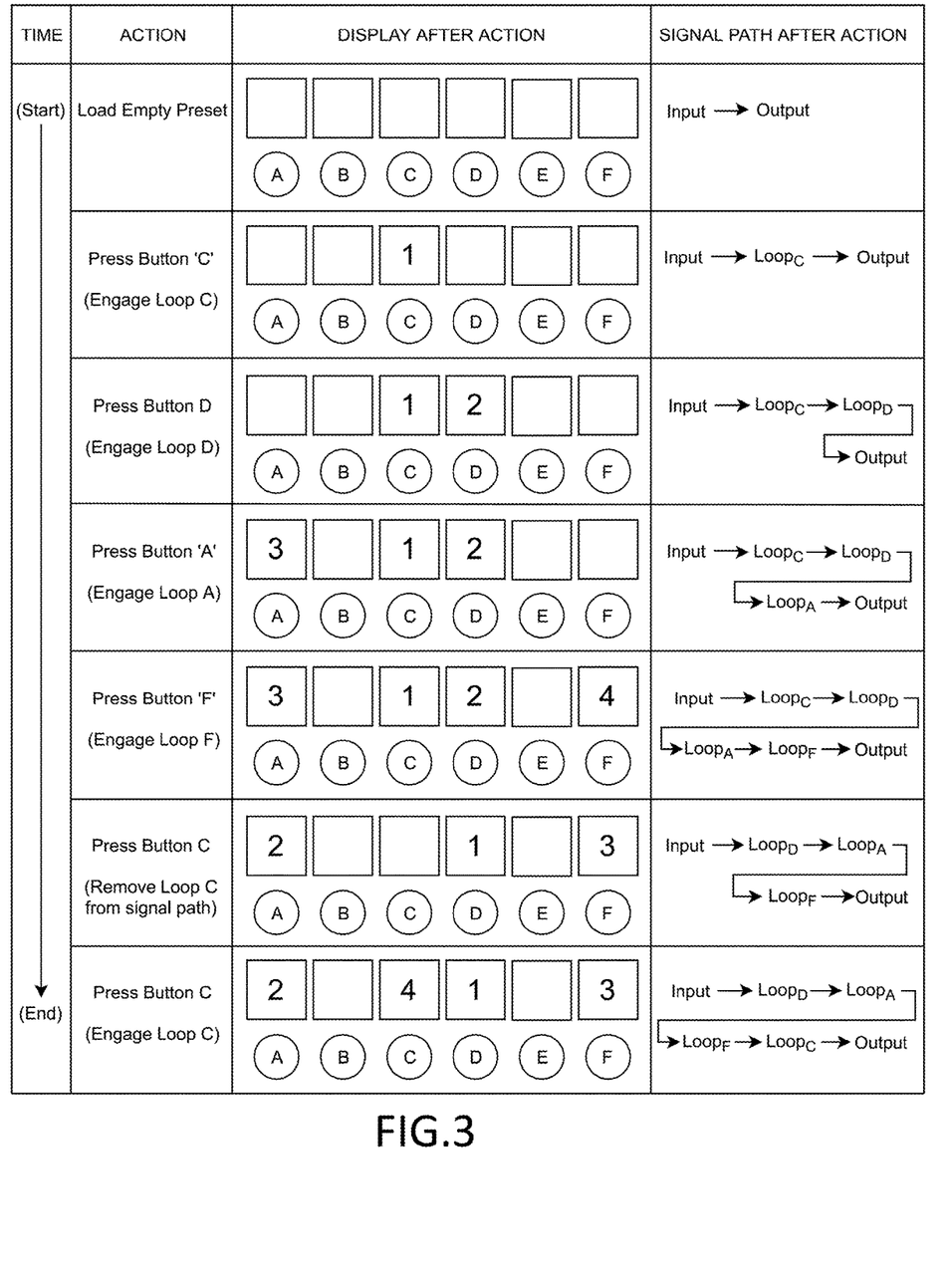
FIG. 3 shows exemplary steps a user would take to program a preset in accordance with a preferred embodiment of the present invention.

The table of FIG. 3 details exemplary steps a user could take (i.e. user actions) in order to program a preset. For the sake of brevity, user-actuated switches 110a to 110f are referred to as 'buttons' within the figure. The steps detailed in FIG. 3 relates the pressing of the user-actuated switches 110a to 110f to the digits displayed by the controller 100 display elements 120a to 120f as well as to the resultant signal path within the electronic switching array 210. The preset programming begins with the loading of an 'empty preset' in which the input 211 of the electronic switching array 210 is connected directly to the output 212.

Further referring to FIG. 3, when a loop is not in the signal path the display element 120a to 120f corresponding to that particular loop is blank. When a loop is engaged, that is to say in the signal path, the display element 120a to 120f corresponding to that particular loop indicates the series position of the loop within the preset. When the first loop is engaged in a previously blank preset, that loop is inserted between the input 211 and the output 212 of the electronic switching array 210. Any subsequent loop additions to the preset are made by inserting the newly added loop between the last engaged loop in the signal path and the output 212 of the electronic switching array 210. By pressing the user-actuated switch 110a to 110f (button) corresponding to an engaged loop, that loop is removed from the signal path and the display elements 120a to 120f for any engaged loops that were positioned after the loop being removed are updated to reflect the new signal path. As shown in the DISPLAY AFTER ACTION column, the sequence (series order) in which the loops 214 to 219 are coupled between the input 211 and the output 212 is visually shown by display elements 120a to 120f. In this particular example, the series order is indicated using numerals.

Figure 4:
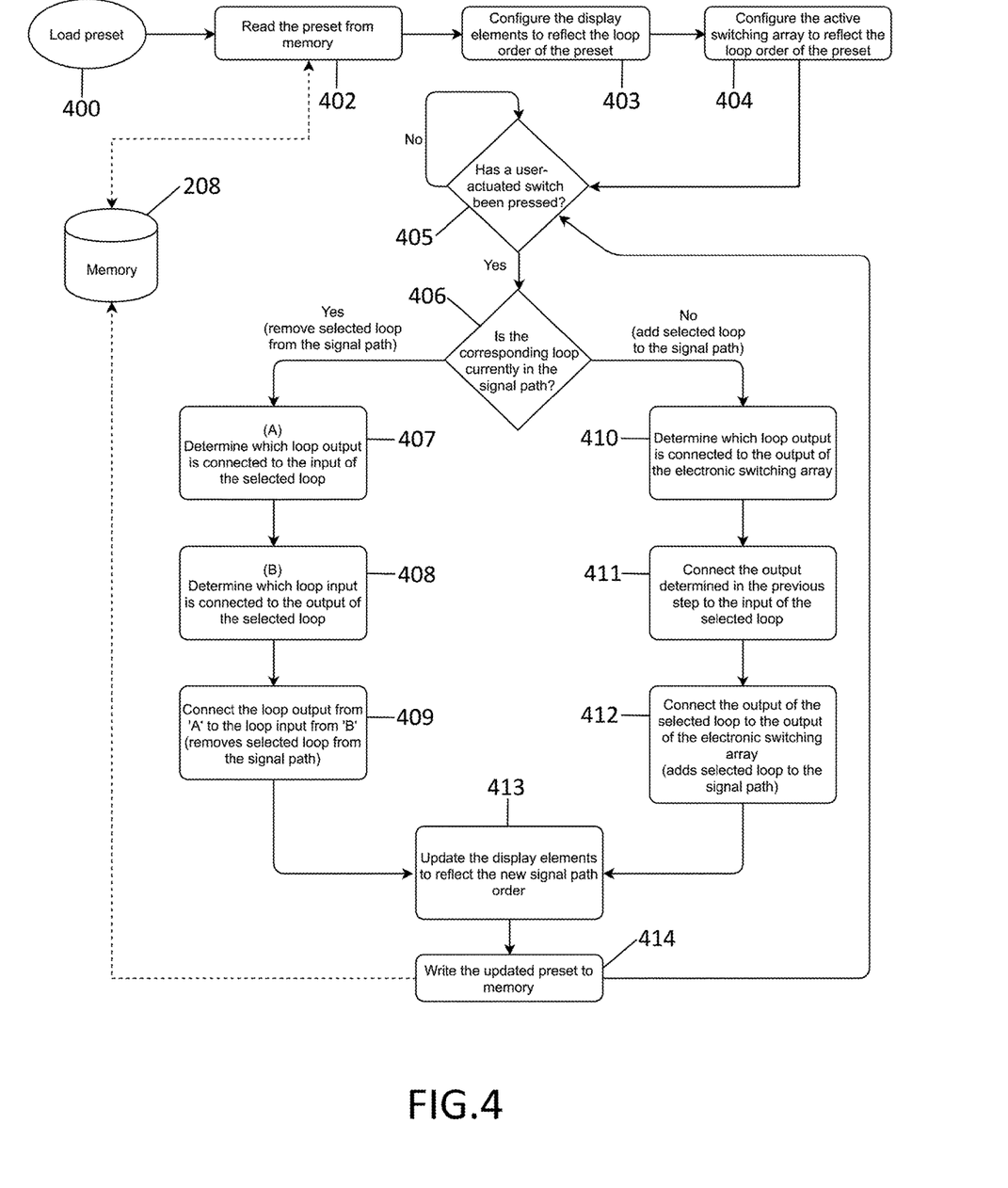
FIG. 4 shows an exemplary flow chart of steps executed by the controller to configure both the electronic switching array and the display elements of the controller in accordance with a preferred embodiment of the present invention.

FIG. 4 illustrates an exemplary flow diagram for programming a re-orderable loop switcher 200 in real-time once a preset has been selected. First, the processor 206 receives a command(s)/instruction(s) to load the preset at step 400. At step 402, the data for the given preset is retrieved from memory 208 by the processor 206. In step 403 the data retrieved in step 402 is used by the processor 206 to configure the display elements 120a to 120f of the controller 100, and, once the processor 206 completes the task, the display elements 120a to 120f visually show the loop order of the given preset (numerally, alphabetically, or via other visual sequence indication(s)). In step 404 the processor 206 again uses the data retrieved in step 402 and configures the electronic switching array 210 such that the loop order reflects the preset.

At step 405 the processor 206 continually checks to see if any one of the user-actuated switches 110a to 110f has been pressed. A person of ordinary skill in the pertinent art would understand that step 405 can be accomplished by any of a variety of means such as, but not limited to, the use of a coded algorithm programmed into the processor 206 or through the use of an interrupt signal(s) and handling routine that may be programed into the processor 206. After a press has been detected at step 405, at step 406, the processor 206 determines whether or not the loop corresponding to the user-actuated switch 110a to 110f that has just been pressed is currently part of the signal path in the given preset. This loop is referred to as the 'selected loop'.

If the selected loop is already part of the signal path, steps 407, 408, and 409 are taken to remove the selected loop from the signal path. Conversely, if the selected loop is not part of the signal path, steps 410, 411 and 412 are taken to add the selected loop to the signal path. Regardless of whether the selected loop has been added to or removed from the signal path, step 413 is reached. In step 413, the display elements 120a to 120f of the controller 100 are updated to reflect the new signal path order. This is followed by step 414 in which the original preset is updated in memory 208 to reflect the new signal path order. It would be understood by an ordinary skilled person in the pertinent art that the steps for updating the signal path (steps 407 to 409 or 410 to 412), updating the display elements (step 413) and updating memory (step 414) may be done in a different sequence from that shown in the figure or at the same time (i.e. parallel processing).

In practice, the method illustrated in FIG. 4, and in particular the steps involved once a user-actuated switch press has been detected, takes less than a few milliseconds to complete using a modern microprocessor running at a clock speed of 10 MHz. The speed with which the method can react to a user-actuated switch press allows for real-time programming of the loop switcher. It should also be pointed out that once a preset has been modified using this method, the preset is automatically saved into memory, thus negating the need for the user to actively save their changes.

Figure 5A:
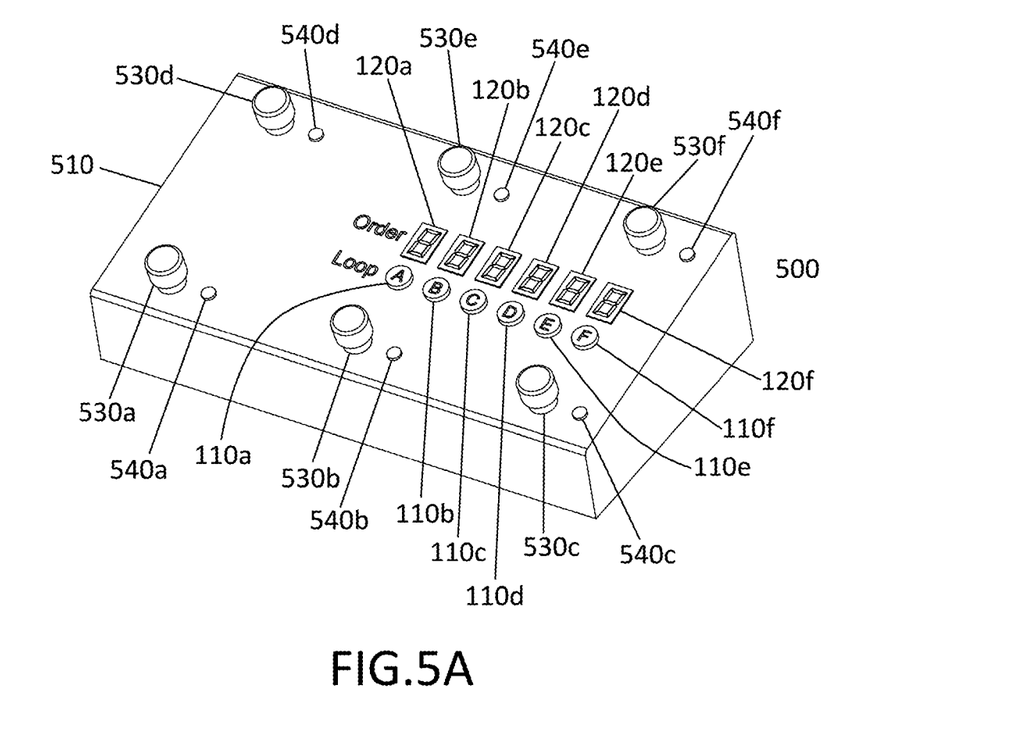
Figure 5B:
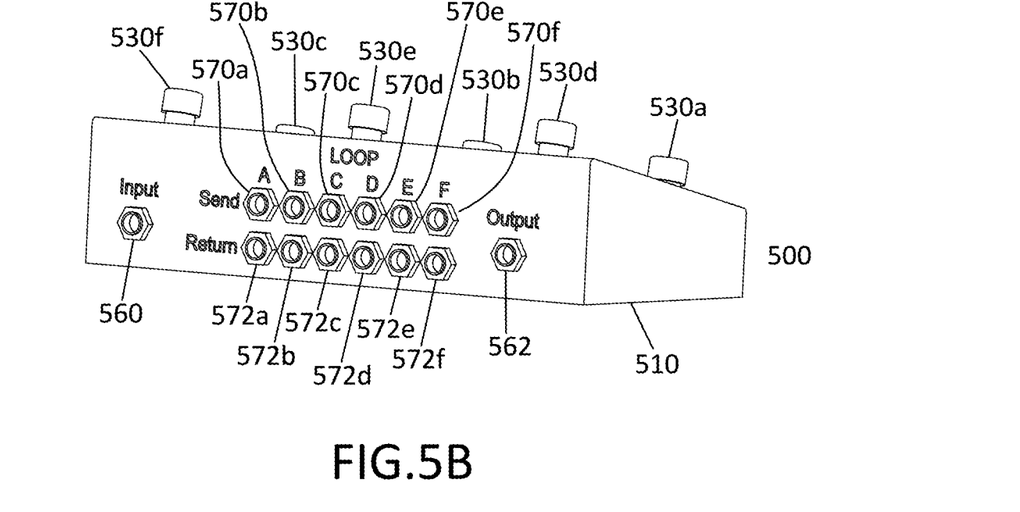
FIG. 5b shows a rear perspective view of an exemplary embodiment of the loop switcher in accordance with the present invention.

FIG. 5A and FIG. 5B depict an exemplary loop switcher 500 in which the first embodiment of the controller 100 is integral. Referring to FIG. 5A, in addition to user-actuated switches 110a to 110f and display elements 120a to 120f, the device has a plurality of preset switches 530a to 530f. In this example, the preset switches 530a to 530f are foot-actuated mechanical switches. Next to each of the preset switches 530a to 530f, there is a corresponding one of indicator lights 540a to 540f, which is used to indicate which preset is active. All of the aforementioned components are securely mounted to a housing 510.

Referring to FIG. 5B, the back of the loop switcher 500 has an input jack 560 to accept an audio source 230 (e.g. from a musical instrument) and a plurality of send 570a to 570f and return 572a to 572f jacks through which the connections to various effect pedals 244 to 249 are made.

The output signal 231 from the loop switcher 500 can be accessed via the output jack 562.

Figure 6:
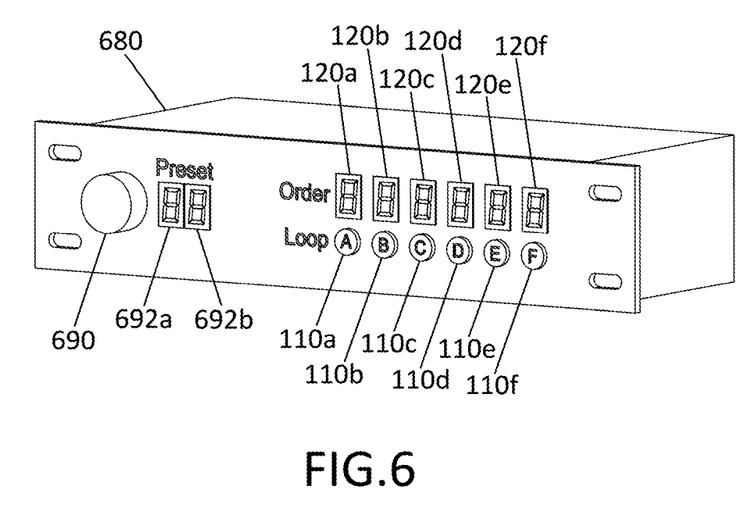
FIG. 6 shows a rack-mountable loop switcher in accordance with another preferred embodiment of the present invention.

FIG. 6 depicts an exemplary rackmount loop switcher 680 in which the controller 100 is integral. In addition to user-actuated switches 110a to 110f and display elements 120a to 120f, the rackmount version has a rotation sensor 690 (e.g. a rotary encoder or similar device) which is used to select the active preset. The active preset being shown on display elements 692a and 692b.

Figure 7:
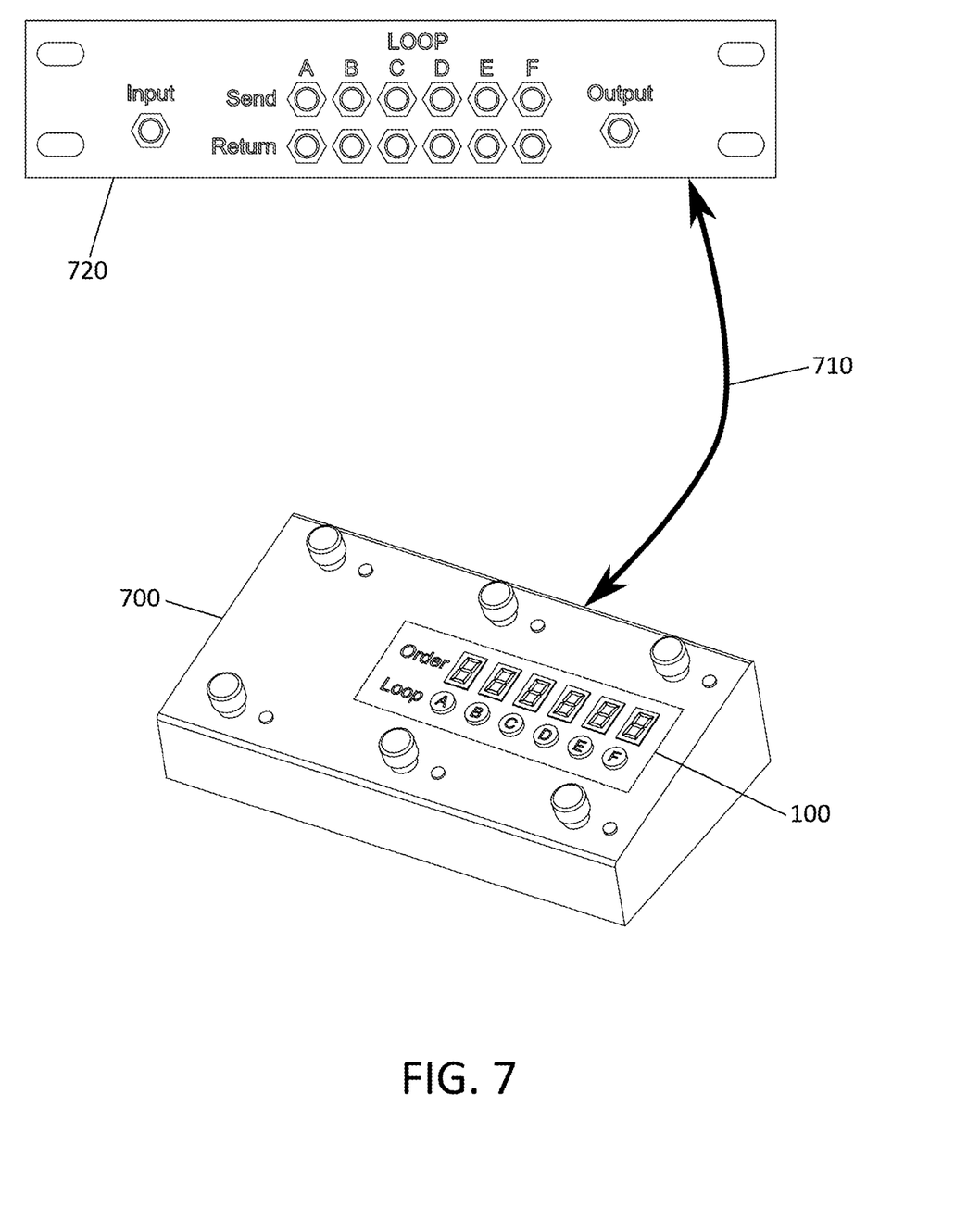
FIG. 7 shows yet another preferred embodiment of the present invention, where the controller is a separate unit from a loop switcher.

FIG. 7 depicts an embodiment in which the controller 100 is integral to a remote housing 700 which is separate from the housing 720 for the generalized loop switcher components 200 (not shown in FIG. 7). As shown in FIG. 7, a communication link 710 between devices 700 and 720 may be made using a wired connection 710 (for example, a CAT5 cable or other suitable wiring means), or a wireless connection (or means) for providing the same or substantially similar functionality.

Figure 8A:
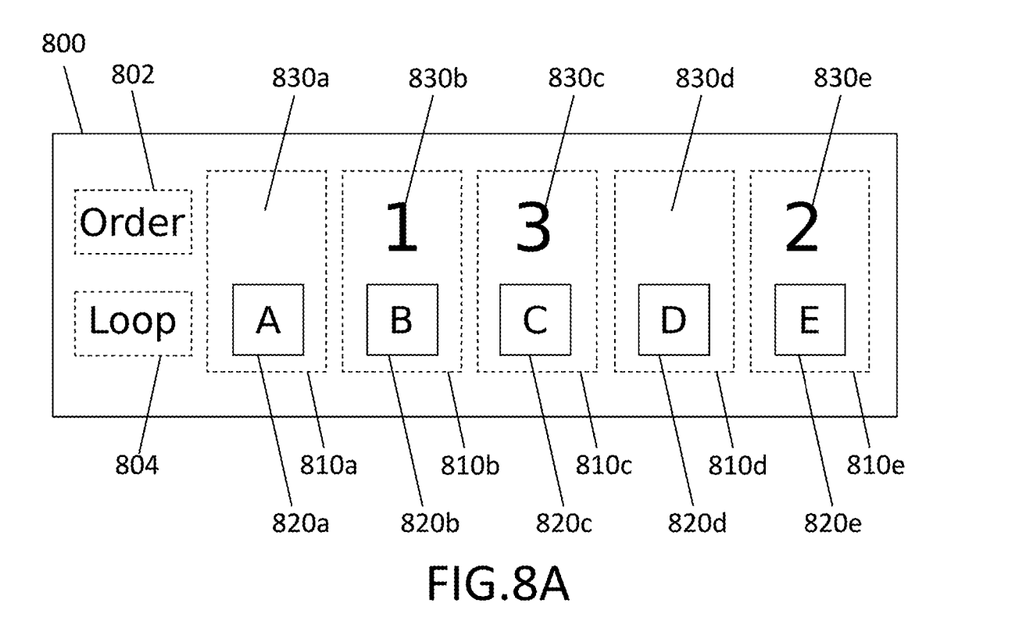
FIG. 8A and FIG. 8B show yet another preferred embodiment of the controller where both the user-actuated switch elements and display elements are integral to a contiguous touch screen.

FIG. 8A depicts an embodiment in which the controller is integral to a touch panel display 800. Through standard programming means, the touch panel display 800 is partitioned into a plurality of touch and display zones 810a to 810e. Within each of the touch and display zones 810a to 810e, there is a corresponding one of touch sensitive areas 820a to 820e equivalent to a user-activated switch 120a to 120f in the first embodiment and, similarly, a display area 830a to 830e equivalent to a display element 130a to 130f in the first embodiment.

In addition to the touch and display zones 810a to 810e, the touch panel display 800 has partitions 802 and 804 which are used to differentiate between the areas of the touch panel display 800 that convey loop order information and those that are touch sensitive and are used to engage/disengage loops. While it is not shown, user-actuated preset switches and indicators similar to the user-actuated preset switches 530a to 530f and preset indicator lights 540a to 540f may also be situated on/mapped onto the touch panel display 800.

Figure 8B:
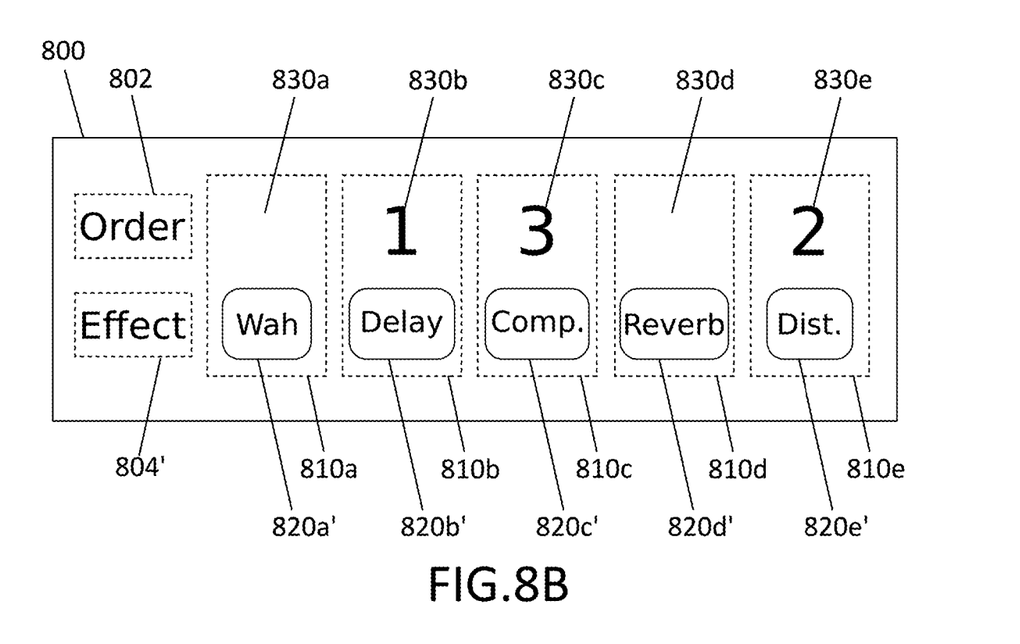

In FIG. 8B, the embodiment of FIG. 8A is modified such that the touch sensitive areas 820a' to 820e' are configured to display the specific type of effect in each respective loop (as opposed to the more generalized labels of FIG. 8A). In this particular example a wah pedal is connected to loop A, a delay pedal to loop B, a compressor (comp.) to loop C, a reverb pedal to loop D and a distortion (dist.) pedal to loop E. Partitioned area 804' has also been modified from the embodiment of FIG. 8A to clearly convey that each loop contains a certain effect type.

The invention claimed is:

1. A controller for controlling a loop switcher with an input, an output, and a plurality of loops, comprising:
   an electronic switching array coupled with the input, the output and the plurality of loops;
   a plurality of switches; and
   a plurality of display elements;
   wherein each of the plurality of switches is associated with a corresponding one of the plurality of display elements and causes the electronic switching array to re-orderably couple a corresponding one of the plurality of loops between the input and the output in a sequence in which the plurality of loops are coupled between the input and the output; and
   the corresponding one of the plurality of display elements visually indicates the sequence order of the corresponding one of the plurality of loops in the sequence in which the plurality of loops are coupled between the input and the output.

2. The controller as recited in claim 1 further comprises a touch panel display, wherein the plurality of switches and the plurality of display elements are mapped on the touch panel display.

3. The controller as recited in claim 1 further comprises a screen display, wherein the plurality of display elements are mapped on the screen display.

4. The controller as recited in claim 1, wherein the plurality of display elements are ones selected from the group consisting of LED dot matrix displays, multi-segmented displays, liquid crystal displays, and OLED displays.

5. The controller as recited in claim 1 further comprises a plurality of preset switches, each of the plurality of preset switches comprises an indicator for indicating when selected, and wherein the loop switcher comprises a processor and memory for creating, saving, editing and deleting a sequence of the plurality of loops associated with each of the plurality of preset switches, and retrieving from the memory and coupling one or more of the plurality of loops in the sequence associated with the selected one of the plurality of preset switches.

6. The controller as recited in claim 5, wherein selecting one of the plurality of switches causes the processor to carry out one of:
   a. adding a corresponding one of the plurality of loops at the end of the sequence associated with the selected one of the plurality of preset switches, if the corresponding one of the plurality of loops is not in the sequence associated with the selected one of the plurality of preset switches; and
   b. removing the corresponding one of the plurality of loops from the sequence associated with the selected one of the plurality of preset switches, if the corresponding one of the plurality of loops is in the sequence associated with the selected one of the plurality of preset switches, and reordering remaining ones of the plurality of loops in the sequence associated with the selected one of the plurality of preset switches.

7. The controller as recited in claim 1 is in communication with the loop switcher wirelessly or wired.

8. The controller as recited in claim 1, wherein the plurality of display elements visually indicates said sequence order numerally.

9. The controller as recited in claim 1, wherein the plurality of display elements visually indicates said sequence order alphabetically.

10. A loop switcher with an input, an output, and a plurality of loops, comprising:
    a controller for controlling the loop switcher, comprising:
        an electronic switching array coupled with the input, the output and the plurality of loops;
        a plurality of switches; and
        a plurality of display elements;
        wherein each of the plurality of switches is associated with a corresponding one of the plurality of display elements and causes the electronic switching array to re-orderably couple a corresponding one of the plurality of loops between the input and the output in a sequence in which the plurality of loops are coupled between the input and the output; and
        wherein the corresponding one of the plurality of display elements visually indicates the sequence order of the corresponding one of the plurality of loops in the sequence in which the plurality of loops are coupled between the input and the output.

11. The loop switcher as recited in claim 10, wherein the controller further comprises a plurality of preset switches, each of the plurality of preset switches comprises an indicator for indicating when selected, and wherein the loop switcher comprises a processor and memory for creating, saving, editing and deleting a sequence of the plurality of loops associated with each of the plurality of preset switches, and retrieving from the memory and coupling the plurality of loops in the sequence associated with the selected one of the plurality of preset switches.

* * * * *